United States Patent [19]

Thulin

[11] Patent Number: 4,618,498

[45] Date of Patent: Oct. 21, 1986

[54] PROCESS FOR PRODUCING LATTICED PASTRY PRODUCTS

[75] Inventor: Robert R. Thulin, Wyckoff, N.J.

[73] Assignee: Nabisco Brands, Inc., Parsippany, N.J.

[21] Appl. No.: 743,380

[22] Filed: Jun. 11, 1985

[51] Int. Cl.[4] .............................................. A23P 1/08
[52] U.S. Cl. ................................... 426/275; 426/94; 426/76; 426/502; 426/503; 426/391; 99/450
[58] Field of Search ...................... 426/89, 93, 94, 274, 426/275, 297, 302, 502, 503, 512, 517, 518, 496, 76, 104, 391

[56] References Cited

U.S. PATENT DOCUMENTS

| | | | |
|---|---|---|---|
| 1,596,652 | 8/1926 | Giovannetti | 426/274 |
| 2,264,115 | 11/1941 | Grainger et al. | 426/502 |
| 3,782,966 | 1/1974 | Forkner | 426/94 |
| 4,517,203 | 5/1985 | Levine | 426/275 |

OTHER PUBLICATIONS

Rietz, et al, 1965, A guide to the Selection, Combination and Cooking of Foods, vol. 2, AVI Publishing Co., Inc., 1965, pp. 48, 49, 50.

Family Circle, Inc., 1972, Family Circle Illustrated Library of Cooking, pp. 1479, 1480 and 1489.

*Primary Examiner*—Raymond N. Jones
*Assistant Examiner*—Carolyn Paden
*Attorney, Agent, or Firm*—Richard Kornutik

[57] ABSTRACT

Process of continuously forming individual product pieces having filler therein and having perforations of substantial size in the top layer thereof. A first continuous flat dough sheet is formed and a natural or artificial filler is periodically deposited on the first continuous flat dough sheet, each of the deposited fillers forming a mound. A perforated second continuous flat dough sheet is placed on top of the first continuous flat dough sheet and deposits of filler thereon, thereby forming a continuous composite comprising the filler deposits enclosed between the perforated, second continuous dough sheet and the first continuous flat dough sheet. The continuous composite is divided into individual pieces, each individual piece having at least one deposit of filler enclosed between a segment of the perforated, second dough sheet and a segment of the first flat dough sheet. The individual pieces are baked and packaged.

15 Claims, 16 Drawing Figures

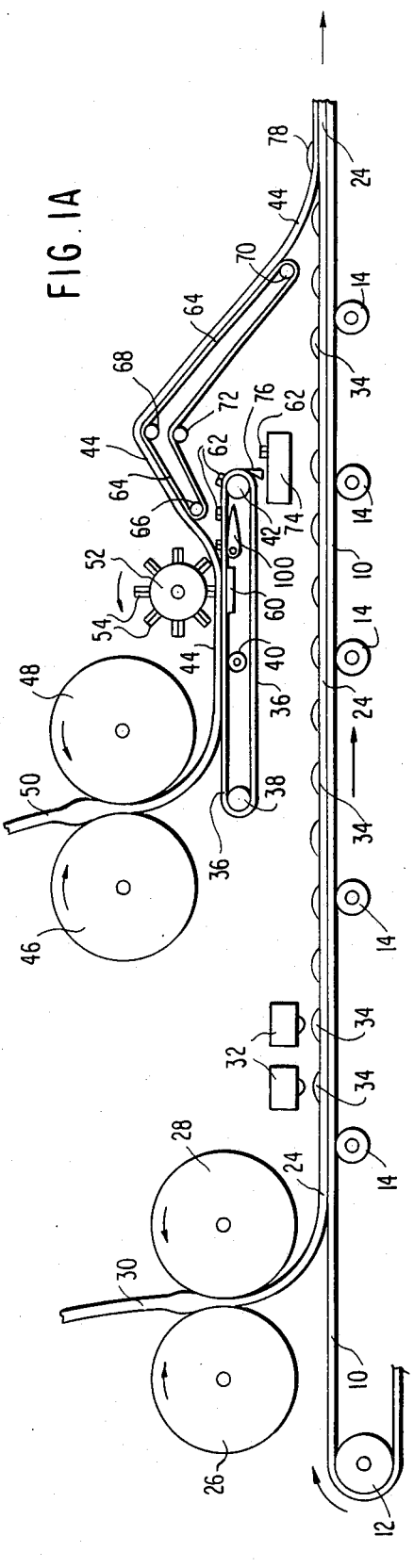
FIG. IA
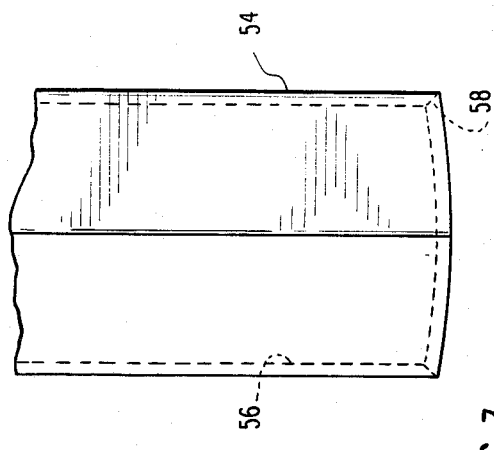
FIG. 3
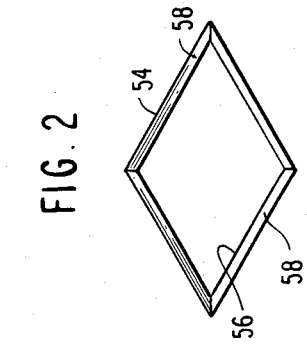
FIG. 2
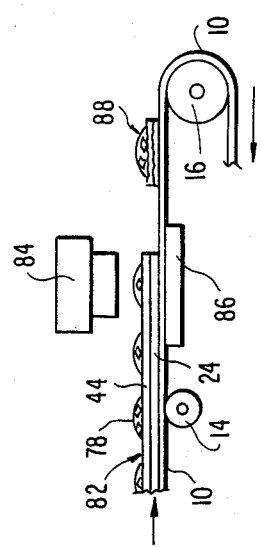
FIG. IB

PROCESS FOR PRODUCING LATTICED PASTRY PRODUCTS

BACKGROUND OF THE INVENTION

1. Field Of The Invention

The invention relates to a process of preparing baked pieces having a perforated top layer.

2. Prior Art

U.S. Pat. No. 4,075,359 (Thulin) discloses a process of forming a continuous flat dough piece subdivided to define individual product pieces and having perforations of substantial size formed in the product pieces. A continuous flat dough sheet, transporting the dough piece on a belt of a material to which the dough will adhere in response to pressure. Cutting elements are moved through the dough to subdivide the sheet to define individual product pieces, simultaneously cut out sections of dough and press the cut out sections to the belt with sufficient force to cause adhesion thereto. The dough piece is separated from the belt without disturbing the cut out sections thus providing perforations in the flat dough piece. The cut out sections are then removed from the belt. Each dough section cut out of the product pieces is cut out by a tubular cutting element having an inner and outer wall, a cutting edge defined by the junction of the outer wall and an inclined surface that extends inwardly and upwardly from the cutting edge into the inner wall. The inclined surface of the cutting edge forces the dough downwardly and inwardly to cause the dough section to adhere to the conveyor.

U.S. Pat. No. Des. 247,071 (Neidenberg et al.) discloses a flat cracker having rounded or eliptical holes therein and semicircular holes in the edges thereof.

BROAD DESCRIPTION OF THE INVENTION

An object of the invention is to provide a process for preparing pastry dough pieces, having a latticed top pastry dough layer and having a filling therein, for use in producing backing goods. Another object of the invention is to provide a process for producing such baked goods. A further object of the invention is to provide apparatus for carrying out such process. A still further object of the invention is to provide pastry dough pieces, having a latticed top dough layer and having a filling therein, and to provide baked goods derived from such dough pieces. Other objects and advantages of the invention are set out herein or are obvious herefrom to one ordinarily skilled in the art.

The objects and advantages of the invention are achieved by the process, pastry dough pieces, baked goods and apparatus of the invention.

The invention involves a process of continuously forming individual product pieces having filler therein and having perforations of substantial size in the top layer thereof. The invention process includes forming a first continuous flat dough sheet and transporting the first continuous flat dough sheet on a first conveyor belt. At least one portion of a natural and/or artificial filler is periodically deposited on the first continuous flat dough sheet, each of the deposited fillers forming a mound. A second continuous flat dough sheet is formed. The second continuous flat dough sheet is transported on a second conveyor belt of a material to which the dough of the second continuous flat dough sheet will adhere in response to pressure. The second conveyor belt is positioned above the first conveyor belt along the axis of movement of the first conveyor belt after the filler depositors. The second conveyor belt is made of a material to which dough adheres, particularly when the dough is pressed against it. The cutting elements are moved through the second continuous flat dough sheet to form a multitude of holes in the second continuous flat dough sheet. Each such hole contains a dough piece therein. The cutting elements are adapted to press the perimeter of each dough piece so that the perimeter of each dough piece adheres to the second conveyor belt. The second continuous flat dough sheet is lifted off of the second conveyor belt by means of a third conveyor belt without disturbing the cut out dough pieces adhered to the second conveyor belt, thereby providing perforations in the second continuous flat dough sheet. The third conveyor belt is positioned above the end portion of the second conveyor belt along the axis of movement of the second conveyor belt and above the first conveyor belt. The perforated, second continuous flat dough sheet is placed on top of the first continuous flat dough sheet and deposits of filler thereon, thereby forming a continuous composite comprising the filler deposits enclosed between the perforated, second continuous dough sheet and the first continuous flat dough sheet. The continuous composite is divided into individual pieces, each individual piece having at least one deposit of filler enclosed between a segment of the perforated, second dough sheet and a segment of the first flat dough sheet. The filler shows through the perforations in the segments of the second dough sheet.

The filled dough pieces are optionally glazed and then are baked and packaged. The packaged baked pieces have long term storage ability. The consumer can heat or warm the baked pieces in a toaster or other heating device for a quickly-prepared, tasty, pastry.

Preferably the cutting elements are tubes, each of the tubes having an inner wall, an outer wall and a cutting edge on the lower end thereof. The cutting edge is defined by the junction of the outer wall and an inclined surface that extends inwardly and upwardly from the cutting edge into the inner wall. The inclined surface of the cutting edge, as the cutting edge cuts through the second continuous dough sheet, forces the dough inwardly and downwardly to cause at least a portion of the dough section to adhere to the second conveyor belt. Preferably the second conveyor belt is made of polyester.

Preferably the cutting elements are affixed to the outside of a rotary drum, the rotary drum rotating the cutting elements sequentually through the cutting action. Also preferably the cutting elements are affixed to the lower end of a reciprocating device. Preferably the cutting edge of each cutting element, in the plane of the cutting element, forms a diamond.

Preferably there is a first group of regularly spaced cutting elements aligned in a straight line, which is perpendicular to the axis of movement of the second conveyor belt and the second continuous dough sheet, and there is a second group of regularly spaced cutting elements aligned in a straight line, which is perpendicular to the axis of movement of the second conveyor belt and the second continuous dough sheet. The alignment line of the second group of cutting elements intersects one edge of each of the cutting elements of the first group. Each of the cutting elements of the second group is positioned on a line which is perpendicular to the alignment line of the second group of cutting elements and which passes between two of the cutting elements of the first group.

Preferably, in starting up the process, the leading edge of the second continuous flat dough sheet is lifted from the second conveyor belt onto the third conveyor belt by means of an elongated cam located under the second conveyor belt just before the front of the third conveyor belt. The elongated cam pushes that portion of the second conveyor up into the same plane as the third conveyor belt and in close proximity to the front of the third conveyor belt so that the leading edge of the second continuous flat dough sheet feeds onto the third conveyor belt.

Preferably a plurality of deposits of the filler, which are aligned on a line perpendicular to the axis of movement of the first conveyor belt and the first continuous conveyor belt, are periodically deposited on the first continuous dough sheet.

Preferably the continuous composite is cut into a series of side-by-side individual pieces, a plurality in number in each such side-by-side alignment. Also preferably, simultaneously with the cutting step, the edges of the segment of the first flat dough and the edges of the segment of the perforated, second continuous dough sheet of each individual piece are crimped or pressed together so as to assure the sealing of the edges of the segments. The individual pieces are baked (preferably in a band oven) and then are packaged.

Any conventional cookie, cracker or pastry dough can be used.

The invention also includes apparatus for continuously forming individual product pieces having filler therein and having perforations of substantial size in the top layer thereof. The invention apparatus includes means for forming a first continuous flat dough sheet, and a first conveyor belt means for transporting the first continuous flat dough sheet. There is means for periodically depositing at least one portion of a natural and/or artificial filler on the first continuous flat dough sheet. There is also means for forming a second continuous flat dough sheet. There is a second conveyor belt means for transporting the second continuous flat dough sheet. The second conveyor belt means has a conveyor belt of a material to which the dough of the second continuous flat dough sheet will adhere in response to pressure. The second conveyor belt means is positioned above the transporting means along the axis of movement thereof after the filler depositing means. There is means for moving cutting elements through the second continuous flat dough sheet to form a multitude of holes in the second continuous flat dough sheet. Each such hole contains a dough piece therein. The cutting elements are adapted to press the perimeter of each dough piece so that the perimeter of each dough piece adheres to the second conveyor belt means. There is means for lifting the second continuous flat dough sheet off of the second conveyor belt means without disturbing the cut out dough pieces adhered to the second conveyor means, thereby providing perforations in the second continuous flat dough section. The lifting means is positioned above the end portion of the conveyor belt means along the axis of movement of the conveyor belt means and above the transporting means. There is also means for placing the perforated, second continuous flat dough sheet on top of the first continuous flat dough sheet and deposits of filler thereon, thereby forming a continuous composite comprising the filler deposits enclosed between the perforated, second continuous dough sheet and the first continuous flat dough sheet. There further is means for dividing the continuous composite into individual pieces. Each individual piece has at least one deposit of filler enclosed between a segment of the perforated, second dough sheet and a segment of the first flat dough sheet. The filler shows through the perforations in the segments of the second dough sheet.

Preferably the conveyor belt of the second conveyor belt means is made of a material to which the cut out dough pieces of the second continuous dough sheet adheres. That material preferably is polyester.

Preferably the cutting elements are tubes, each of the tubes having an inner wall, an outer wall and a cutting edge on the lower end thereof. The cutting edge is defined by the junction of the outer wall and an inclined surface that extends inwardly and upwardly from the cutting edge into the inner wall. The inclined surface of the cutting edge, as the cutting edge cuts through the second continuous dough sheet, forces the dough inwardly and downwardly to cause the perimeter of the dough section to adhere to the second conveyor belt means. Preferably the cutting elements are affixed to the outside of a rotary drum, the rotary drum rotating cutting elements sequentially through the cutting action. Also preferably the cutting elements are affixed to the lower end of a vertically reciprocating device. Preferably the cutting edge of each cutting element, in the plane of each cutting element, forms a diamond.

Preferably the lifting means includes a conveyor belt, and an elongated cam is located under the second conveyor belt just before the front of the third conveyor belt. The elongated cam is adapted to push that portion of the second conveyor belt up into the same plane as the third conveyor belt and in close proximity to the front of the third conveyor belt so that, in feeding the second continuous flat dough sheet through the apparatus, the leading edge of the second continuous flat dough sheet feeds onto the third conveyor belt. The elongated cam then is returned to its non-lifting position.

The invention further includes the individual product pieces, having filler therein, having perforations of substantial size in the top dough layer thereof and having a bottom dough layer, produced by the method of the invention.

The invention includes the individual baked goods produced by baking the individual invention product pieces, plus packages containing a plurality of the individual invention baked goods.

BRIEF DESCRIPTION OF THE DRAWINGS

In the drawings:

FIG. 1, formed by FIGS. 1A and 1B, is a schematic view illustrating the general arrangement employed in practicing one embodiment of the invention;

FIG. 2 is a bottom view of the dough engaging end of one embodiment of one of the dies used in the apparatus of FIG. 1;

FIG. 3 is a side view of the dough engaging end of the die of FIG. 2;

DETAILED DESCRIPTION OF THE INVENTION

Figure 4:
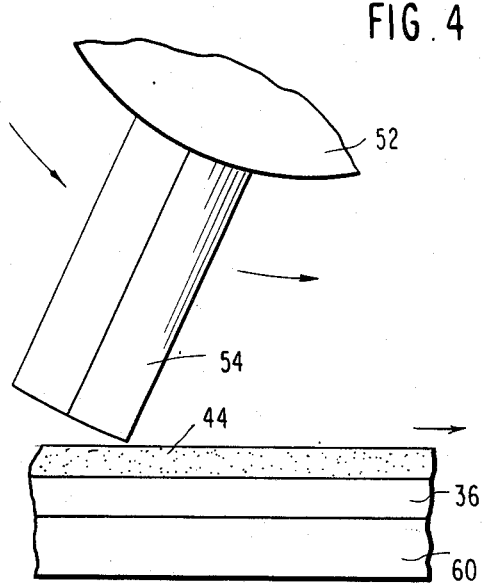
FIG. 4 is a side view of the dough engaging end of the die of FIG. 3 just before the cutting of a hole in a moving sheet of dough.

The preferred embodiment of the invention is shown in FIG. 1. Conveyor belt 10 passes around front noser roller 12, over support rollers 14, around end noser roller 16 and back to front noser roller 12. Sheet 24 of dough is formed by counter rotating rollers 26 and 28 (i.e., the first dough sheeter) from dough 30, which typically had a temperature of 105° F. Dough sheet 24 usually has a width of 38 inches and a thickness of 0.0625 inch, but can be of any suitable or convenient width and thickness. Dough 30 has a sheetable consistency.

Any dough formula can be used for dough 30 and dough 50 which can be picked up after being perforated.

After leaving the first dough sheeter, dough sheet 24 contacts conveyor belt 10 and is carried under filler dispensers (jelly depositors) 32. In the embodiment shown in FIG. 1, two banks of each having three filling dispensers 32 are used. In commercial operations a larger number of filler deposits, such as, 8 or 16 or more, in each bank would be more efficient and economical. Fillings 34 are dispensed in three mounds across dough sheet 30. Fillings 34 can be any suitable jelly, fruit preserves and other conventional filling, for example, grape jelly, peach filling, raspberry jelly, apple filling or the like.

Conveyor belt 36 is composed of cotton or polyester having suitable adhesion characteristics to the dough. Conveyor belt 36 is located, for example, a few inches above conveyor belt 10 and down the process line from jelly depositors 32. Conveyor belt 36 passes around front noser roller 38, over support roller 40, around end noser roller 42 and back to front noser roller 38. Conveyor belt 36 may be oriented horizontally (preferably) or at an upwards incline of, say, about 5 to about 15 degrees from the horizontal plane of conveyor belt 10, which is normally oriented parallel to the ground. Sheet 44 of dough is formed by counter rotating rollers 46 and 48 (i.e., the second jumbo sheeter, but any other sheeting equipment can be used) from dough 50. Dough sheet 44 usually has the same thickness and width as that of dough sheet 24, but preferably dough sheet 44 is a fraction of an inch wider than dough sheet 24 to allow for the coverage of fillings 34 while still aligning with the edges of dough sheet 24. Dough 50 typically has the same composition as dough 30, although different dough compositions can be used.

Figure 7:
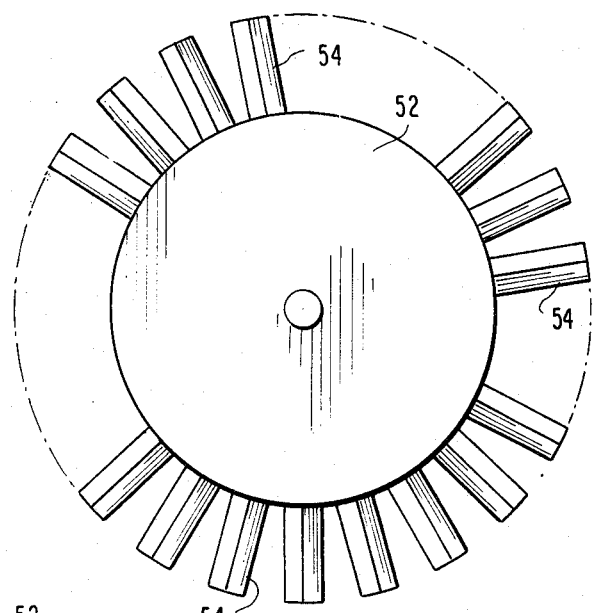
FIG. 7 is a partial side view of the rotating drum, containing a multitude of the dies of FIG. 3, of the apparatus of FIG. 1.
Figure 8:
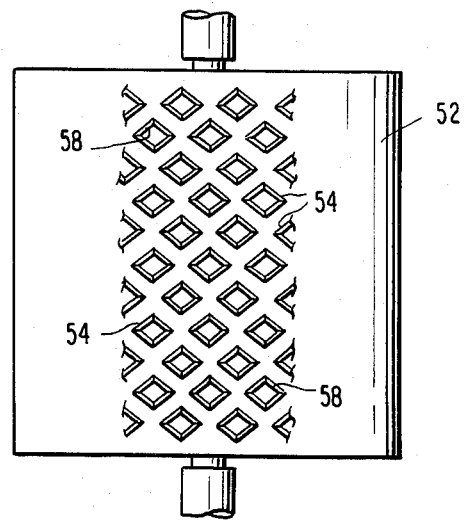
FIG. 8 is a partial frontal view of the rotating drum of FIG. 7.

After leaving the second jumbo sheeter, dough sheet 44 contacts conveyor belt 36 and is carried under rotary cutter 52. As shown in FIGS. 7 and 8, rotary cutter 52 has a series of lines of elongated die heads 54. Die heads 54 in every other line are offset so as to be located halfway between die heads 54 in the two adjacent lines. Preferably each line has fourteen die heads 54, but that number can vary as desired or needed. Die heads 54 are hollow or tubular (wall 56) as seen in FIGS. 2 and 3. The lower end of die heads 54 are curved so as to form an outward-directed arc, which is referred to as the radius of the cutting end—see FIG. 3. The radius of the curve of cutting end coincides with a circle which has its center point on the axis of rotation of rotary cutter 52 (see FIG. 7). The radius of the curve of the cutting end intersects with the top surface of conveyor belt 36 (carry dough sheet 44). Referring to FIG. 2, the lower end of each die head 54 is diamond in shape—this is the preferred shape. The lower edge of wall 56 tapers inwardly to form cutting edge on face 58—see FIG. 3. Wall 56 preferably has a thickness of 1/16 inch and cutting face 58 preferably has an angle of 30 to 60 degrees to the vertical. A reciprocating cutter could be used, but rotary cutter 52 is preferred because a rotary cutter does not have any moving parts (except for its central axle).

Figure 5:
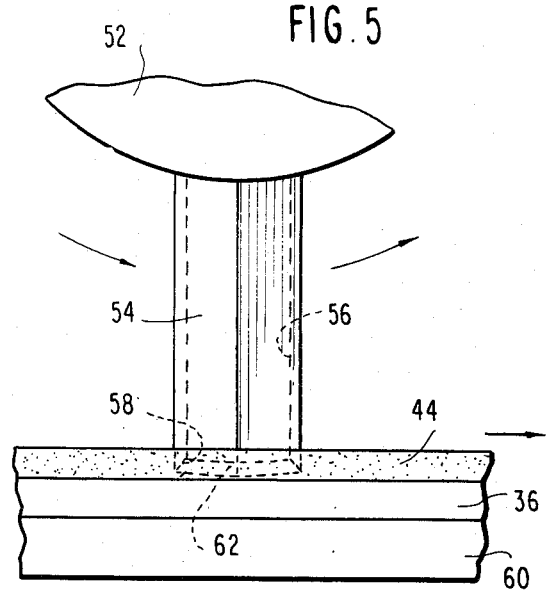
FIG. 5 is a side view of the cutting of a hole in such moving sheet of dough by the die of FIG. 3.
Figure 6:
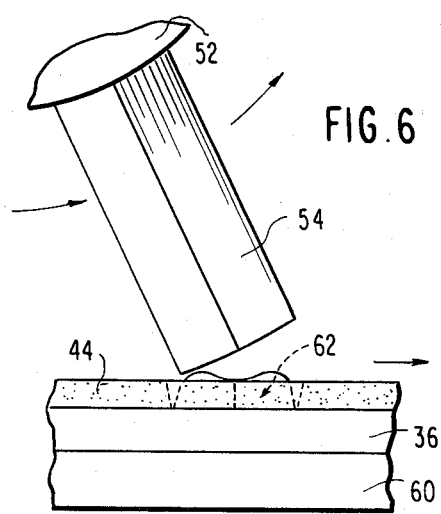
FIG. 6 is a side view of the disengagement of the die of FIG. 3 after cutting a hole in such moving sheet of dough.
Figure 9:
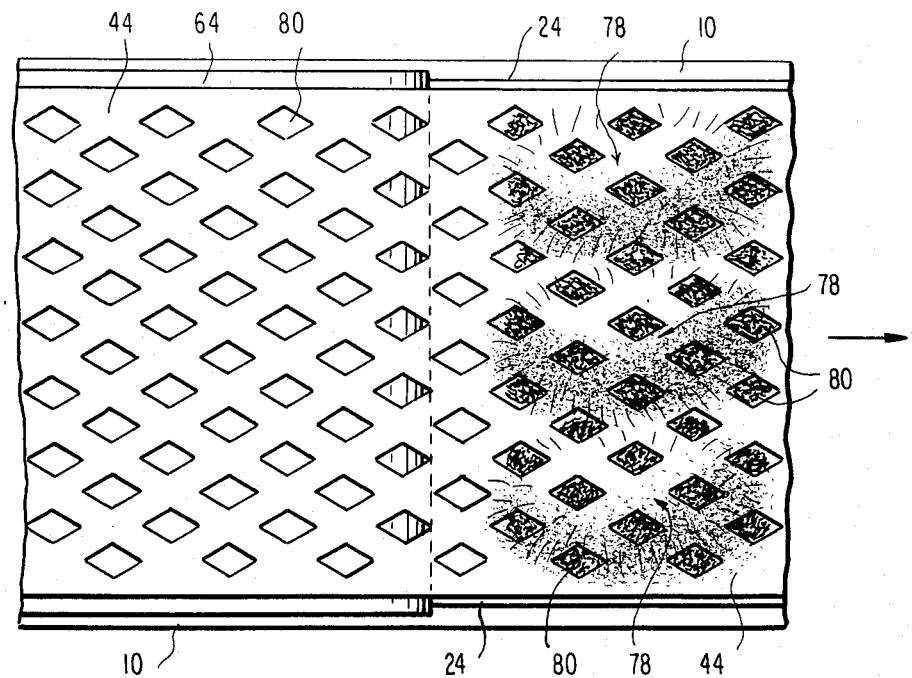
FIG. 9 is a top view of the latticed top dough layer being contacted with the bottom dough layer containing mounds of filling thereon in the arrangement of FIG. 1.

A continuous series of holes are cut in dough sheet 44, as illustrated in FIG. 9, by means of dies 54 of rotary cutter 52. Referring to FIG. 4, a die head 54 rotates into contact with moving dough sheet 44. The curved dough cutting end of such die head 54 cuts dough sheet 44, as illustrated in FIG. 5—cutting edge 58 of such die head 54 does the cutting and contacts conveyor belt 36. Back-up plate 60 is positioned below the upper flight of conveyor belt 36 at the region where the end of die head 54 is forced through dough sheet 44. The result of the cutting dough sheet 44 by die heads 54 is diamond shaped dough pieces 62 having a length of about 3/16 inch. The curved end of die head 58 fits flush with the top surface of conveyor belt 36 as conveyor belt 36 advances and die head 54 swings through its cutting sequence. In effect, the curved end of die head 54 rolls across advancing conveyor belt 36. This rolling action of die head 54 avoids cutting conveyor belt 36. The outwards arc of the end of die head 54 has a radius which is equal to the radius of the circle around the end of all of die heads 54 mounted on or circular device 52. Referring to FIG. 6, as dough sheet 44 advances, such die head 54 rotates upwards and out of contact with conveyor belt 36 and dough sheet 44. The inward and upward incline of cutting surface or edge 58 forces the dough of cutout piece 62 inwardly and downwardly to cause the edges of cutout dough pieces 62 to adhere to cotton cloth conveyor belt 36. No pins are needed to shove cutout dough pieces 62 out of the end of dies 54.

Conveyor belt 64 is L-shaped, having a first leg and a second leg. Conveyor belt 64 passes around first noser roller 66, over top support roller 68, around end noser roller 70 over bottom support roller 72 and back to front noser roller 66. The first leg of conveyor belt 64 extends upwardly from front noser roller 66 at an angle of, say, 25 to 40 degrees to top support roller 68. The second leg of conveyor belt 64 extends downwardly from top support roller 68 at an angle of, say 25 to 40 degrees, to end noser roller 70. The front end of the first leg of conveyor belt 64 is located above conveyor belt 36 between rotary cutter 52 and end noser roller 42. Dough sheet 44, after passing rotary cutter 52, is fed up onto the front end of conveyor belt 64. Elongated cam 100 is positioned under conveyor belt 36. In starting up, elongated cam 100 is rotated so that its outward end pushes conveyor belt 36 up into the plane of the top of the front leg of conveyor belt 64 and adjacent to the front edge of conveyor belt 64. In this manner, the leading edge of dough sheet 44 is fed onto conveyor belt 44. At this point in time, cam 100 is rotated back into its normal position and rotary cutter 52 is started up and lowered into operational position. Rotary cutter 52 is not used before that point in time so as to avoid problems with dough pieces 62 which have adhered to conveyor belt 36 hitting conveyor belt 64. As dough sheet 44 is lifted off of conveyor belt 36, dough pieces 62 stick to conveyor belt 36, are carried onward by conveyor belt 36 and are scraped off of the end of conveyor belt 36 into container 74 for the collection of the dough pieces 62 which can be recycled or blended into subsequent dough batches. Scraping blade 76 is positioned against the back end of conveyor belt 36 to remove dough pieces 62 from conveyor belt 36. The front end of conveyor belt 64 is located, say, 0.5 to 1 inch above dough pieces 62 as they pass under such front end.

As shown in FIG. 1, latticed dough sheet 44 continues down the second leg of conveyor belt 64. The back end of conveyor belt is located, say, 1 to 2 inches above the top of filler mounds 34. Latticed, top dough sheet 44 passes off of lattice sheet conveyor 64 onto moving bottom dough sheet 24 and filler mounds 34 thereon. Reference is made to FIG. 9 for a top view and FIG. 1 for a side view of such operation. Latticed, top dough sheet 44, by means of its own weight and flexibility, molds around filler mounds 34 to form raised portions 78. FIG. 9 shows three raised portions 78 in line across latticed, top dough sheet 44; the lattice (hole 80) in top dough sheet 44 is also shown in FIG. 9. The darkened (shaded) portion of holes 80 is filler 34 under top dough sheet 44. Top dough sheet 44 contacts bottom dough sheet 24 except in the areas of the latter containing filler mounds 34.

Figure 10:
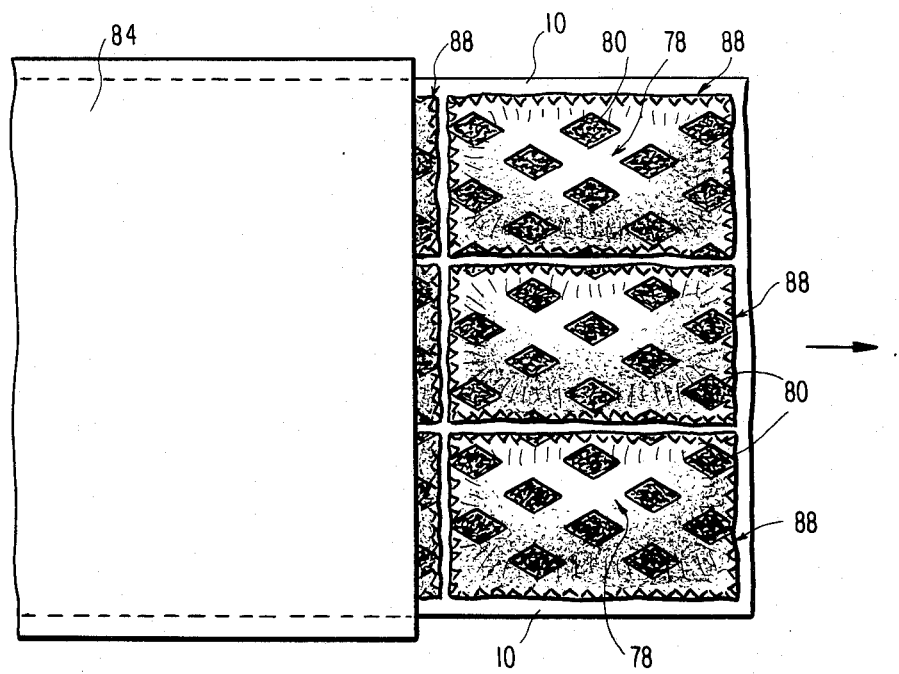
FIG. 10 is a top view of the cut piece coming out of the cutter of the apparatus used in FIG. 1.

The combined dough sheet 24 and dough sheet 44 (combination 82) advances to reciprocating cutter 84, although a rotary dough cutter could be used. Back-up plate 86, located immediately under conveyor belt 10, is positioned under reciprocating cutter 84. Reciprocating cutter 84 has a series of blades (not shown) at right angles to each other so as to cut combination 82 into rectangular pieces 88, as shown in FIG. 10. Combination 82 is cut into a continuous series three side-by-side rectangular pieces 88, each of which contains one filler mound 34. Reciprocating cutter 84 operates, for example, at 120 strokes per minute, thereby producing 360 of rectangular pieces 88 per minute. At the same time that rectangular pieces 88 are cut by reciprocating cutter 84, plate (not shown) on both sides of and parallel to the cutting blades press the edges of each piece in order to assure the sealing of the edges of the top dough layer to the edges of the bottom dough layer to prevent the filler from exiting via the edges of pieces 88.

Figure 11:
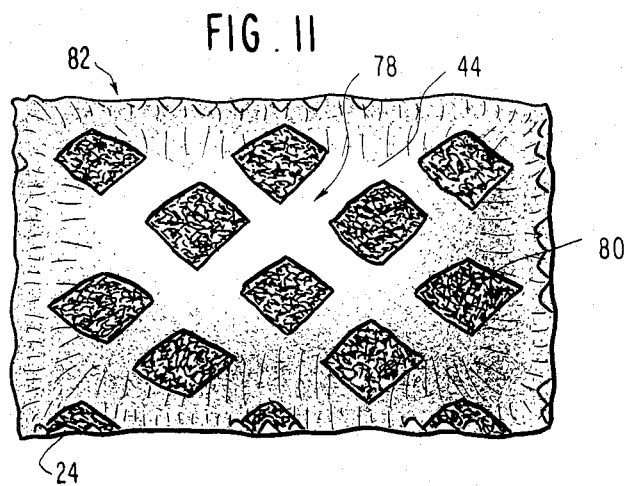
FIG. 11 is a top view of one of the baked pieces produced by the arrangement of FIG. 1.
Figure 12:
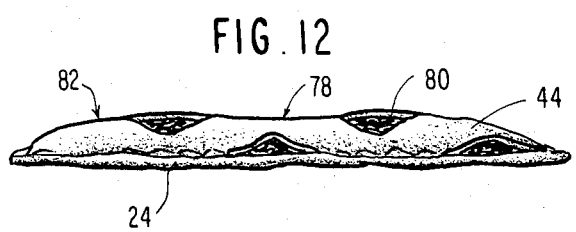
FIG. 12 is a side view of the baked piece of FIG. 11.

Rectangular pieces 88 are then baked and packaged in a conventional manner. The baked pieces are shown in FIGS. 11 and 12. Also, rectangular pieces 88 can optionally be glazed before being baked.

The baked rectangular pieces 88 can be quickly used by a consumer by heating it in a toaster or other heating device. Packaged baked pieces 88 have long storage stability.

Rotary cutter 52 can be replaced by any type of useful dough sheet cutter, such as, a reciprocating cutter. Reciprocating cutter 84 can be replaced by any type of cutter, such as rotary cutter.

Any number of deposits 34 across can be made. Also, the composite filling dough can be cut into any number of individual pieces, side-by-side, as long as each has at least one filling deposit therein.

Figure 13:
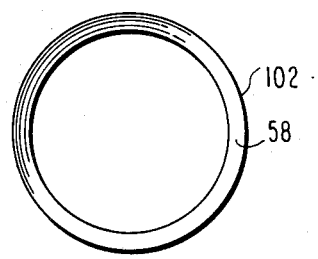
FIG. 13 is a side view of another version of the dough engaging end of one of the dies used in the apparatus of FIG. 1.
Figure 15:
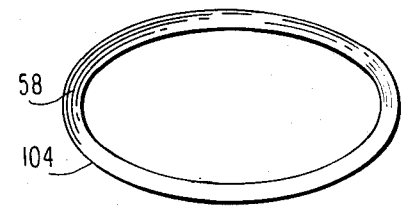
FIG. 15 is a bottom view of a further version of the dough engaging face of one of the dies used in the apparatus of FIG. 1.
Figure 14:
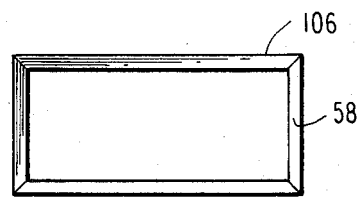
FIG. 14 is a side view of another version of the dough engaging end of one of the dies used in the apparatus of FIG. 1.

Die heads 54, which have a parallelogram or diamond horizontal (lateral) cross-section, can have any cross-sections, such as, circular, square, eliptical and rectangular. Die head 102 has a circular cross-section—see FIG. 13. Die head 106 has a rectangular cross-section—see FIG. 14. Die head 104 has an eliptical cross-section—FIG. 15.

Figure 16:
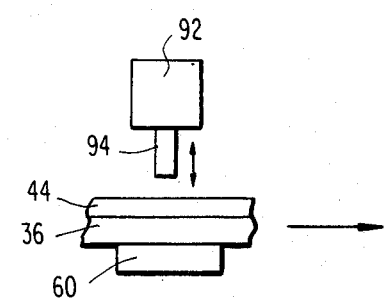
FIG. 16 is a side view of a reciprocating cutter used in another embodiment of the apparatus of FIG. 1.

FIG. 16 shows the use of reciprocating cutter 92 having reciprocating cutting element 94. Hollow cutting element has the same end configuration and cutting portion as cutting elements 54, 102, 104 or 106.

In FIG. 7, cutting elements 96 are similar to cutting elements 54, except that the longitudinal sides of cutting elements 96 are shaped to lie on a radial line from the center of circular device 52.

It will be seen from the foregoing that the invention provides simple and efficient means for forming composite dough pieces for the production of perforated, jelly-filled toaster pastries and like products.

What is claimed is:

1. The process of continuously forming individual product pieces having filler therein and having perforations of substantial size in the top layer thereof, comprising:
   (a) forming a first continuous flat dough sheet;
   (b) transporting the first continuous flat dough sheet on a first conveyor belt;
   (c) periodically depositing at least one portion of a natural filler or an artificial filler on the first continuous flat dough sheet;
   (d) forming a second continuous flat dough sheet;
   (e) transporting the second continuous flat dough sheet on a second conveyor belt of a material to which the dough of the second continuous flat dough sheet will adhere in response to pressure, the second conveyor belt being positioned above the first conveyor belt along the axis of movement of the first conveyor belt after the at least one filler depositor (c);
   (f) moving cutting elements through the second continuous flat dough sheet to form a multitude of holes in the second continuous flat dough sheet, each such hole containing a dough piece therein, the cutting elements pressing the perimeter of each dough piece so that the perimeter of each dough piece adheres to the second conveyor belt;
   (g) lifting the second continuous flat dough sheet off of the second conveyor belt by means of a third conveyor belt without disturbing the cut out dough pieces, adhered to the second conveyor belt, thereby providing perforations in the second continuous flat dough sheet, the third conveyor belt being positioned above the end portion of the second conveyor belt along the axis of movement of the second conveyor belt and above the first conveyor belt;

(h) placing the perforated, second continuous flat dough sheet on top of the first continuous flat dough sheet and deposits of filler thereon, thereby forming a continuous composite comprising the filler deposits enclosed between the perforated, second continuous dough sheet and the first continuous flat dough sheet; and (i) dividing the continuous composite into individual pieces, each individual piece having at least one deposit of filler enclosed between a segment of the perforated, second dough sheet and a segment of the first flat dough sheet, the filler showing through the perforations in the segments of the second dough sheet.

2. The process as claimed in claim 1 wherein the second conveyor belt is made of a material to which the cut out dough pieces of the second continuous dough sheet adheres.

3. The process as claimed in claim 2 wherein the second conveyor belt is made of polyester or cotton.

4. The process as claimed in claim 1 wherein the cutting elements are tubes, each of the tubes having an inner wall, an outer wall and a cutting edge on the lower end thereof, the cutting edge being defined by the junction of the outer wall and an inclined surface that extends inwardly and upwardly from the cutting edge into the inner wall, the inclined surface of the cutting edge, as the cutting edge cuts through the second continuous dough sheet, forcing the dough inwardly and downwardly to cause the perimeter of the dough section to adhere to the second conveyor belt.

5. The process as claimed in claim 4 wherein the cutting elements are affixed to the outside of a rotary drum, the rotary drum rotating the cutting elements sequentially through the cutting action.

6. The process as claimed in claim 4 wherein the cutting elements are affixed to the lower end of a vertically reciprocating device.

7. The process as claimed in claim 4 wherein the cutting edge of each cutting element, in the plane of the cutting element, forms a diamond.

8. The process as claimed in claim 1 wherein there is a first group of regularly spaced cutting elements aligned in a straight line, which is perpendicular to the axis of movement of the second conveyor belt and the second continuous dough sheet, and there is a second group of regularly spaced cutting elements aligned in a straight line, which is perpendicular to the axis of movement of the second conveyor belt and the second continuous dough sheet, the alignment line of the second group of cutting elements intersecting one edge of each of the cutting elements of the first group, each of the cutting elements of the second group being positioned on a line which is perpendicular to the alignment line of the second group of cutting elements and which passes between two of the cutting elements of the first group.

9. The process as claimed in claim 1 wherein a plurality of deposits of the filler, which are aligned on a line perpendicular to the axis of movement of the first conveyor belt and the first continuous conveyor belt, are periodically deposited on the first continuous dough sheet.

10. The process as claimed in claim 9 wherein continuous composite (h) is cut in step (h) into a series of side-by-side individual pieces, a plurality in number in each such side-by-side alignment.

11. The process as claimed in claim 10 wherein, simultaneously with cutting step (h), the edges of the segment of the first flat dough and the edges of the segment of the perforated, second continuous dough sheet of each individual piece are crimped together so as to assure the sealing of the edges of the segments.

12. The process as claimed in claim 1 wherein each individual piece (i) has one deposit of filler therein.

13. The process as claimed in claim 1 wherein the individual pieces (i) are baked and then packaged.

14. The process as claimed in claim 1 wherein, in starting up the process, the leading edge of the second continuous flat dough sheet is lifted from the second conveyor belt onto the third conveyor belt by means of an elongated cam located under the second conveyor belt just before the front of the third conveyor belt, the elongated cam pushing that portion of the second conveyor up into the same plane as the third conveyor belt and in close proximity to the front of the third conveyor belt so that the leading edge of the advancing second continuous flat dough sheet feeds onto the third conveyor belt.

15. The process as claimed in claim 1 wherein, in step (c), at least one portion of a natural filler and at least one portion of an artificial filler are periodically and separately deposited on the first continuous flat dough sheet.

* * * * *